No. 775,136. PATENTED NOV. 15, 1904.
J. GODDARD.
CAMERA.
APPLICATION FILED AUG. 26, 1904.
NO MODEL.
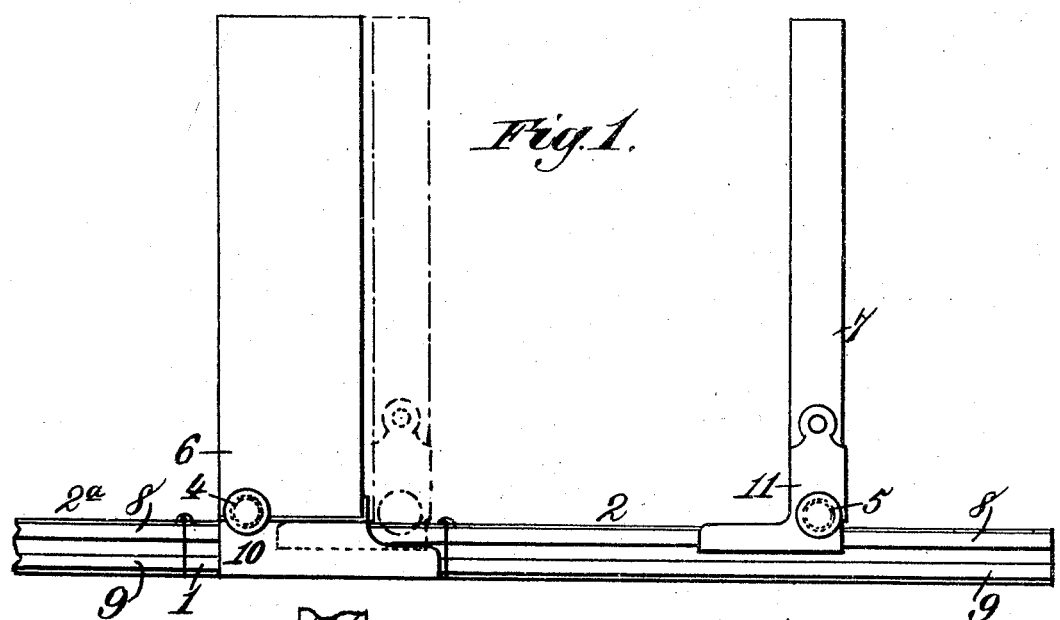
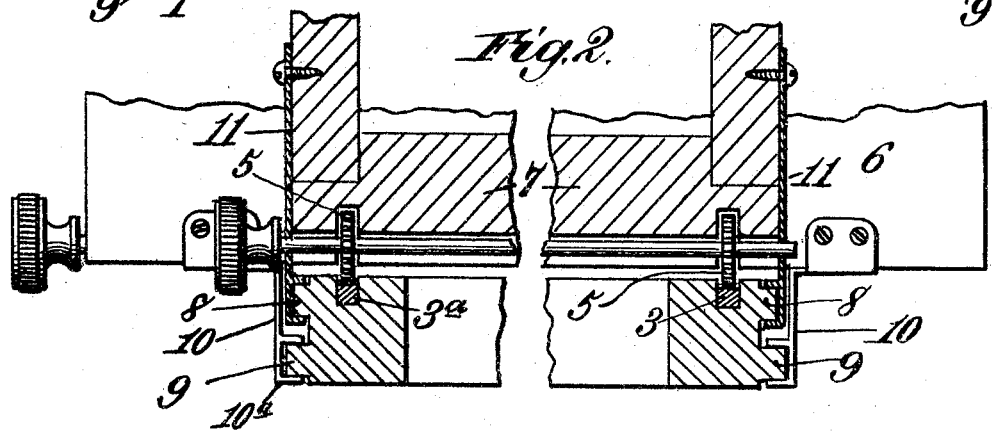
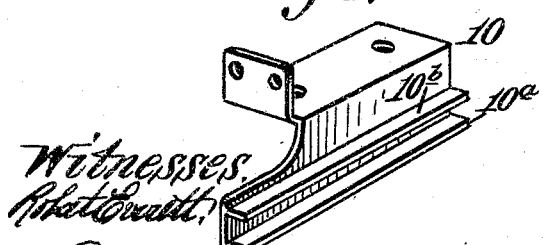
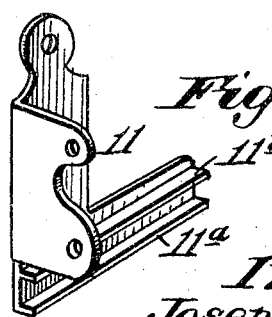
Witnesses.
Inventor.
Joseph Goddard.
By James L. Norris.
Atty.

No. 775,136. Patented November 15, 1904.

UNITED STATES PATENT OFFICE.

JOSEPH GODDARD, OF ROCHESTER, NEW YORK, ASSIGNOR TO SENECA CAMERA COMPANY, OF ROCHESTER, NEW YORK, A CORPORATION OF NEW YORK.

CAMERA.

SPECIFICATION forming part of Letters Patent No. 775,136, dated November 15, 1904.

Application filed August 26, 1904. Serial No. 222,295. (No model.)

*To all whom it may concern:*

Be it known that I, JOSEPH GODDARD, a citizen of the United States, residing at Rochester, in the county of Monroe and State of New York, have invented new and useful Improvements in Cameras, of which the following is a specification.

My invention relates to improvements in cameras, and is particularly intended for embodiment in connection with folding-extension cameras.

The invention has for its object to provide novel means whereby the camera-box and the lens-frame may be firmly supported in different positions of extension of the camera apparatus along the folding extensions or beds, whereby also the camera-box and lens-front may be nested closely or compactly together upon the camera-base when the camera is not in use and folded up for shipment or convenient carrying about from place to place.

In cameras of the folding-extension class it is essential that the camera-box and lens-front when in extended position shall be firmly supported, necessitating elongated feet by which they are slidably connected to the front and rear extension sections or beds. This has heretofore generally necessitated a camera base or central section of otherwise unnecessary width, because of the fact that the nearest point to which the camera-box and lens-front could be brought together for nesting was determined by the length of the feet thereof, no provision having been made for these feet passing each other to enable a nesting together of the box and lens-front in closer relation. An arrangement for overcoming the above has been proposed in which the front and rear sections or beds are provided with a plurality of grooves on each side so arranged that when the box and lens-front are adjusted together upon the camera-base the feet of one may pass inside of the feet of the other. I provide a more simple and satisfactory arrangement for accomplishing this result by a novel manner of connecting the camera-box and lens-front to the front and rear sections or beds in sliding relation thereupon, insuring a firm support for the camera-box and lens-front, avoiding looseness or wabbling and economizing in the cost and time of production and affording a more satisfactory arrangement than the plurality-groove contrivance.

With the stated objects in view my invention consists in a camera having the features hereinafter described and claimed, reference being made to the accompanying drawings, illustrating the invention, in which—

Figure 1 is a side elevation illustrating the camera-box and lens-front in extended position in full lines and the said front in dotted lines nested up against the camera-box. Fig. 2 is a cross-sectional view. Figs. 3 and 4 are detail views of the camera-box and lens-front feet.

In the said drawings the reference-numeral 1 designates a camera-base or central section, and 2 2$^a$ designate the front and rear folding sections or beds, which are suitably hinged to the central section or camera-base. The said central section and front and rear sections or beds are provided with racks 3 3$^a$, with which the rack-pinions 4 5, mounted for rotation on the camera-box 6 and lens-front 7, are adapted to engage in such manner that upon rotation of such pinions the said box and camera-front may be moved toward and from each other upon the central section or the front and rear sections or beds. Upper and lower tracks 8 9 are formed at each of the opposite side faces or edges of the said central and front and rear sections. The upper pair of tracks is preferably, as shown, slightly narrower than or in a different plane from the lower pair. The camera-box is provided with feet 10, suitably connected thereto and having inturned flanges 10$^a$, which work against the under sides of the lower rails, and said feet are provided with shoes 10$^b$, suitably connected to or formed therewith, which shoes ride upon the upper faces of the lower pair of rails, whereby the said box is afforded a firm support and accurate sliding connection upon the central and front and rear sections.

The lens-front is provided with feet 11 of suitable shape suitably connected thereto and of sufficient length or extension to afford the proper firm support for said lens-front. The feet of the lens-front are provided with inturned flanges $11^a$ at the lower end, which move in contact with the lower faces of the upper pair of rails, and with shoes $11^b$, suitably formed therewith or connected thereto, which shoes ride upon the upper surfaces of the upper pair of rails, as shown. The inturned flanges of the shoes of the feet of the camera-box and lens-front have a neat sliding fit upon the respective rails 8 9, whereby the camera-box and lens-front may be adjusted to and from each other accurately and be firmly supported and objectionable vibration or wabbling of the parts avoided.

The arrangement of the parts is such that when it is desired to fold the camera into a compact space for transportation or convenient carrying about the lens-front and camera-box may be moved to position upon the central section or camera-base, as shown in dotted lines, Fig. 1. In the illustrated example of my invention the feet of the lens-front pass inside the feet of the camera-box, so that the two may be nested together in close relation. It is obvious, however, this arrangement could be reversed.

By my invention I provide a novel construction and arrangement of parts whereby the desired result is secured in a simple, economical, and satisfactory manner.

Having thus described my invention, what I claim is—

In a camera, a camera-bed provided in its opposite side edges with upper and lower rails arranged in different vertical planes, a camera-box and a lens-front provided with elongated feet, the feet of one of said parts having lower flanges engaging the lower faces of the lower pair of rails and having shoes extending in engagement with the upper surfaces of the lower pair of rails, the other of said parts having elongated feet with inturned flanges in engagement with the lower faces of the upper pair of rails and having shoes in engagement with the upper faces of the upper pair of rails, substantially as described.

In testimony whereof I have hereunto set my hand in presence of two subscribing witnesses.

JOSEPH GODDARD.

Witnesses:
F. K. TOWNSEND,
S. D. FRENCH.